United States Patent [19]

Bacon, Jr.

[11] Patent Number: 4,955,690

[45] Date of Patent: Sep. 11, 1990

[54] THIN CALIPER RETROREFLECTIVE TRANSFER

[75] Inventor: Chester A. Bacon, Jr., Oakdale, Minn.

[73] Assignee: Minnesota Mining and Manufacturing Company, St. Paul, Minn.

[21] Appl. No.: 326,480

[22] Filed: Mar. 24, 1989

[51] Int. Cl.⁵ .................... G02B 5/128; G02B 5/134
[52] U.S. Cl. ..................................... 350/105; 350/109
[58] Field of Search ............... 350/105, 104, 106, 107, 350/109, 320; 427/162

[56] References Cited

U.S. PATENT DOCUMENTS

| | | | |
|---|---|---|---|
| 3,382,908 | 11/1965 | Palmquist et al. | 428/31 X |
| 3,449,201 | 10/1966 | Palmquist et al. | 428/325 |
| 3,452,799 | 7/1969 | Hindin et al. | 350/105 |
| 3,700,305 | 10/1972 | Bingham | 350/105 |
| 3,700,478 | 10/1972 | Bingham | 428/323 X |
| 4,192,576 | 3/1980 | Tung et al. | 350/105 |
| 4,377,988 | 3/1983 | Tung et al. | 119/106 |
| 4,648,695 | 3/1987 | Bailey | 428/161 X |
| 4,678,695 | 7/1987 | Tung et al. | 428/325 X |
| 4,763,985 | 8/1988 | Bingham | 350/105 |

OTHER PUBLICATIONS

U.S. Defense Publication No. T987,003, Oct. 1979.

Primary Examiner—Bruce Y. Arnold
Assistant Examiner—Ronald M. Kachmarik
Attorney, Agent, or Firm—Donald M. Sell; Walter N. Kirn; Robert H. Jordan

[57] ABSTRACT

A thin caliper retroreflective transfer comprising a monolayer of retroreflective elements in a support layer, the back stratum of which is a vulcanizable elastomer, and a premask releasably adhered to the front surface thereof to facilitate handling of the transfer and protect the retroreflective elements during handling and application to a substrate. Also a method for making such transfers.

22 Claims, 2 Drawing Sheets

THIN CALIPER RETROREFLECTIVE TRANSFER

FIELD OF INVENTION

The present invention relates to retroreflective sheeting, particularly in the form of thin caliper retroreflective transfer articles adapted for application to substrates, and methods for making same.

BACKGROUND

Retroreflective sheetings, especially microsphere-based versions, are well known and have been widely used for safety purposes, such as warning signs on vehicles or hazard warnings on roadways, and for information purposes, such as traffic control.

Retroreflective sheetings have also been applied to such articles as tire sidewalls, fabrics, and personal articles such as clothing. For instance, U.S. Pat. Nos. 3,382,908 (Palmquist et al.) and 3,449,201 (Palmquist et al.) disclose the application of strips of retroreflective material to the sidewalls of tires. These patents disclose sheet materials comprising an elastomeric support layer with a monolayer of retroreflective elements embedded therein. In such sheetings, the support layer or at least a back stratum thereof is a vulcanizable elastomer which is compatible with the elastomer of the tire side wall. The support layer typically functions to hold the microspheres in desired monolayer arrangement and in desired uniform alignment. In many instances, the support layer provides a major part, if not essentially all, of the body or strength, e.g., tensile strength, needed to enable the sheeting to be handled during at least the latter steps of its fabrication and conversion, e.g., slitting into strips of desired dimension, as well as during the fabrication of the finished tire. Accordingly, the support layer is typically made somewhat thicker, i.e., typically at least about 6 to about 8 mils (150 and 200 microns) in a sheeting having an overall thickness of between about 8 and about 10 mils (200 and 250 microns), than is necessary to merely hold the microspheres in monolayer arrangement and in desired alignment on the finished tire. Such increased thickness tends to increase the cost of the retroreflective sheeting and in many instances the polymeric material used in the support layer is the costliest component of the sheeting. Furthermore, when such sheetings are incorporated into a rubber article as disclosed in the aforementioned U.S. Pat. Nos. 3,382,908 and 3,449,201, the great thickness of the retroreflective sheeting may tend to weaken the article by displacing a substantial portion of the elastomer, such as in the side wall of a bicycle tire wherein the rubber may be only about 30 mils thick (750 microns).

In other instances, when the support layer is made very thin, the retroreflective sheet material may tend to have such a low breaking force that it is easily broken when subjected to the tensile forces encountered during fabrication or conversion, or when being handled during fabrication of the rubber article, particularly after being cut into strip form.

SUMMARY OF INVENTION

The present invention provides a thin caliper retroreflective transfer which can be applied to a desired substrate, e.g., a tire side wall, rubber raft, piece of clothing, to impart a retroreflective property thereto. The present invention also provides a method for making such retroreflective transfers.

Briefly summarized, the retroreflective transfers of the present invention each comprise (a) a support layer and (b) a monolayer of retroreflective elements, e.g., vapor-coated microspheres, partially embedded in and protruding from the front of the support layer, and disposed such that the front surfaces of at least some of the retroreflective elements are exposed so that light incident thereto will be retroreflected. The transfer further comprises (c) a dimensionally stable premask releasably adhered to the front surfaces of the retroreflective elements. By "dimensionally stable", it is meant that the premask will elongate only up to about 8 to about 12 percent, and in some instances, under about 4 percent, when subjected to a tensile force of about 15 pounds/inch-width. In some embodiments, it is preferred that the premask elongate under such conditions between about 4 and about 10 percent such that the sheeting of which the premask is a part may be conformed to the nonplanar surface of a substrate. Sheetings made with premasks having higher elongation under the aforementioned tensile force will typically tend to be difficult to convert, i.e., cut into desired size, and handle during their fabrication and during assembly with the final substrate. By "releasably adhered", it is meant that the premask achieves a bond of between about 50 and about 450 grams/inch-width to the front surfaces of the retroreflective elements and other exposed components of the sheeting.

The support layer, or at least the back stratum thereof is a vulcanizable or curable elastomer which is compatible with the elastomer of the desired substrate, e.g., a vehicle tire side wall. By "compatible" it is meant that when contacted to the substantially uncured substrate such as in a tire mold and subjected to appropriate conditions of heat and pressure for curing, the vulcanizable portion of the support layer will form a strong bond with the simultaneously curing substrate. An advantage of the present invention is that the support layer may be made very thin, thereby permitting the total thickness of the transfer to be made very thin.

In brief summary, one method for making retroreflective transfers of the invention comprises:

(a) providing a carrier adapted to receive and retain a monolayer of retroreflective elements thereon;

(b) forming a monolayer of retroreflective elements on the carrier, the retroreflective elements being retained on the carrier and protruding at least partially therefrom;

(c) applying a support layer over the protruding portions of the retroreflective elements;

(d) removing the carrier, thereby exposing the front surfaces of the retroreflective elements; and (e) releasably adhering a reinforced premask layer to the front surfaces of the retroreflective elements.

The resultant retroreflective transfers can then be applied to a desired substrate. The premask provides dimensional stability enabling the transfer articles to be made in very thin form, e.g., with support layers having effective thicknesses of less than about 3 mils (75 microns), and even less than about 2 mils (50 microns), thereby permitting substantial cost savings. In some instances, sheetings may be made with support layers which are about 1 mil (25 microns) or less in thickness. As used herein, the "effective thickness" of the support layer is meant to refer to the dimension from the back, i.e., embedded, surfaces of the retroreflective elements to the rear surface of the support layer. Thus, in the case of sheeting of the invention with a support layer having an effective thickness of about 2 mils (50 microns) and microspheres which are about 2 mils (50 microns) in diameter and embedded into the support layer to about 50 percent of their diameter, the sheeting will have an overall thickness of about 4 mils (100 microns). The ability to make and utilize such thin retroreflective sheetings also tends to reduce the detrimental impact upon strength of the article to which the transfer is to be applied because the reduced thickness of the transfer in turn means that the thickness of the portion of material of the article which is displaced is also reduced. Furthermore, the premask permits the transfer to be handled with only ordinary care during its fabrication and application to a desired article instead of necessitating the use of extraordinary care and special handling.

The premask protects the front surfaces of the retroreflective elements under a wide variety of conditions. For instance, it can protect the surfaces of the retroreflective elements from becoming dirty or damaged during fabrication of the retroreflective transfer and application of the transfer to a desired article, e.g., a tire or rubber raft. For instance, during assembly of the article, the sheeting might otherwise become soiled with mold release agents, staining agents, overspray of clear coat applied to the article, substrate overflow during vulcanization, etc. The premask can also provide increased dimensional stability to the retroreflective sheeting, especially to cut outs and small strips of the sheeting. The premask can be made with controlled release and extensibility characteristics, depending upon the desired application. If left on the transfer during vulcanization of the article, the premask, because it is adhered to the front surfaces of the retroreflective elements can prevent the elastomer of the article from flowing over the front side of the transfer under vulcanization conditions.

BRIEF DESCRIPTION OF THE DRAWING

The invention will be further explained with reference to the drawing, wherein.

These figures, which are idealized, are not to scale and are intended to be merely illustrative and non limiting.

DETAILED DESCRIPTION OF INVENTION

As discussed above, the method of the invention comprises, in brief summary:

(a) providing a carrier adapted to receive and retain a monolayer of retroreflective elements thereon;
(b) forming a monolayer of retroreflective elements, e.g., glass microspheres with reflectors thereon, on the carrier, the retroreflective elements being retained on the carrier and protruding at least partially therefrom;
(c) applying a support layer over the protruding portions of the retroreflective elements;
(d) removing the carrier, thereby exposing the front surfaces of the retroreflective elements;
(e) releasably adhering a reinforced premask layer to the front surfaces of the retroreflective elements.

A typical carrier for use in the invention is paper sheet with a layer of polyethylene on at least one side thereof, e.g., RM-35526, an MQ-1 grade paper having a basis weight of about 89 pounds/3000 feet$^2$ from Schoeller Technical Papers Inc. Other illustrative examples include RM-34533 XKL-2, a paper having a basis weight of about 50 pounds/3000 feet$^2$, and LD TL-226, a polyethylene having a basis weight of about 28.8 pounds/3000 feet$^2$, available from Thilmany Pulp and Paper Co.

When heated, the polyethylene coating tends to soften, permitting the retroreflective elements to become partially embedded therein. Following cooling, the polyethylene becomes firm, such that the carrier retains the retroreflective elements in a monolayer.

Depending in part upon the characteristics of the carrier and the retroreflective elements, it may be desired to condition the carrier or elements to achieve desired release properties. For instance, release agents or adhesion promoters may be desired.

Figure 1:
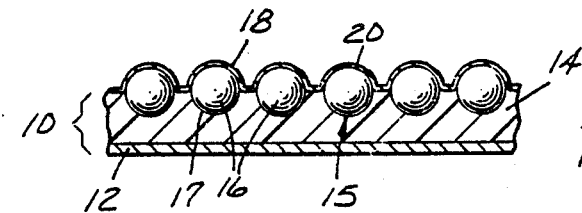
FIG. 1 is a cross-sectional illustration of a portion of an intermediate construction of a retroreflective transfer of the invention during its fabrication.

The most typical kind of retroreflective elements are transparent microspheres having reflectors on the rear surfaces thereof. Such retroreflective elements typically provide satisfactory levels of retroreflective brightness over a wide range of incidence angles, i.e., the angles at which the light strikes the sheeting, a property sometimes referred to as "angularity". FIG. 1 shows carrier 10 which comprises paper backing 12 and polymeric coating 14 into which retroreflective elements 15 comprising microspheres 16 with reflectors 18 on rear surfaces 20 thereof are partially embedded.

If transparent microspheres are used, the microspheres are preferably substantially spherical in shape in order to provide the most uniform and efficient retroreflection. Furthermore, the microspheres are preferably substantially transparent so as to minimize the amount of light absorbed by the microspheres and thereby optimize the amount of light which is retroreflected by sheetings of the invention. The microspheres are typically substantially colorless, but, may be colored to produce special effects if desired.

Microspheres used herein may be made from glass or synthetic resin having the optical properties and physical characteristics taught herein. Glass microspheres are typically preferred because they typically cost less, are harder, and exhibit superior durability to microspheres made of synthetic resins.

Microspheres used in the present invention will typically have an average diameter of between about 40 and about 200 microns. Microspheres which are smaller than this range may tend to provide lower levels of retroreflection because of diffraction effects, whereas microspheres larger than this range may tend to impart undesirably rough texture to the sheeting or tend to be more readily dislodged by abrasive forces. Microspheres used in the present invention will typically have a refractive index of between about 1.7 and about 2.0, the range typically considered to be useful in microsphere-based retroreflective products where, as here, the front surfaces of the microspheres are exposed or air-incident.

As mentioned above, microsphere-based retroreflective elements of retroreflective transfers of the invention have reflectors on the rear surfaces thereof. Typically, such reflectors are applied to the rear surfaces of the microspheres after the microspheres have been partially embedded in the carrier, thereby facilitating the arrangement of the microspheres in substantially uniform direction for retroreflection. Furthermore, as is known, the size of reflectors, i.e., how much of the surface of the microspheres which is covered, may be controlled in part by controlling the depth into the carrier to which the microspheres are embedded prior to application of the reflectors thereto.

Among the variety of materials which may be used for this purpose are vacuum-deposited or vapor-coated metal coatings, such as aluminum or silver; chemically-deposited metal coatings, such as silver; metal-coated plastic films; metal flakes; such as aluminum or silver; and dielectric coatings. Aluminum or silver coatings are typically preferred, because they tend to provide the highest retroreflective brightness. The reflective color of silver coatings is typically preferred to that of aluminum coatings, but an aluminum vapor coat is normally more preferred, because silver reflective coatings typically suffer more severe degradation in outdoor exposure than do aluminum coatings. U.S. Pat. No. 3,700,305 (Bingham) discloses dielectric mirrors or coatings that may be used as reflectors in retroreflective articles of the invention.

Next, the support layer is applied over the protruding portions of the retroreflective elements. The support layer typically comprises a durable polymeric material which forms a flexible, elastomeric layer and preferably provides good adhesion to the retroreflective elements, e.g., glass microspheres and aluminum coatings. The support layer is typically formed from a liquid or flowable coating composition which is coated, e.g., by knife coating, over the protruding portions of the retroreflective elements and at least partially cured.

The support layer should have flexibility, extensibility, and elastic properties which are similar to those of the article to which the transfer is to be applied, or at least sufficient to meet the stresses to which the resultant article will likely be subjected, in order to improve the resistance of the retroreflective transfer to degradation when the resultant article is used. For instance, support layers which are flexible and can return to substantially their original dimensions after being elongated about 50 percent or more will typically be suitable for use on vehicle tires.

Illustrative examples of materials which are useful for use in the support layer in many applications of the invention are polytetramethylene ether diamine, e.g., having a molecular weight of about 12,000 to about 16,000; HYCAR ATBN, an amine-terminated butadiene acrylonitrile rubber available from B.F. Goodrich Co.; and bis-(3-aminopropyl)-polytetrahydrofuran, e.g., having a molecular weight of about 5,000, available from BASF. Such materials are typically used in combination with a hardening material, e.g., an epoxy resin. For instance, the illustrative materials just mentioned may be used in combination with EPON 828, an epoxy resin available from Shell Oil Company. Support layers of the invention are typically formulated in weight ratios of rubber to epoxy of between about 1:1 and about 4:1, and more typically about 2.5:1. Formulations with ratios which are lower than about 1:1 may tend to yield resultant compositions which form layers that tend to be too stiff whereas ratios which are higher than about 4:1 may tend to yield resultant compositions which form layers that tend to be too soft. Other examples of support layer materials which can be used in retroreflective sheetings of the invention include, but are not limited to, thermoplastic, heat-activated, ultraviolet-cured, and E-beam-cured adhesives or polymer systems.

The support layer should be sufficiently thick to cover the rear surfaces of microspheres that are between about 1.7 and about 4 mils (40 to 200 microns) in diameter to a depth, i.e., effective thickness, of about 1 to about 3 mils (25 to 75 microns) when dry and cured. It is believed that this range of thickness represents optimum thicknesses in that typically these are the lowest thicknesses which are sufficient to support the retroreflective elements as necessary, i.e., hold them in substantially a monolayer without dislodging and oriented in desired manner.

The support layer should be thermally stable, i.e., remain firm enough to support the retroreflective elements in desired array and orientation, under conditions to which the transfer is likely to be subjected during application to and fabrication of a substrate and subsequent use of the substrate. The temperature to which the support layer should be thermally stable will depend in part upon the application for which the retroreflective transfer is being prepared. For instance, in the case of retroreflective transfers which are to be applied to the sidewalls of tires, it is typically preferred that the support layer remain thermally stable at least when heated up to about 400° F. (205° C.) for about five minutes, the temperature at which the tire carcasses are typically cured at.

Similarly, the amount of elongation which is desired of the support layer is dependent in part upon the intended end use of the article and conditions under which the transfer will be subjected during fabrication of the article. As used herein, "elongation" is meant to refer to the magnitude of original dimension to which an object may be stretched and then recover to substantially its original dimension. In the case of retroreflective transfers which are to be applied to tire sidewalls, the elongation of the binder layer should typically be at least about 100, and preferably about 200, percent in order to withstand the forces to which it will be subjected during the use of the tire.

The support layer should typically be made up of a material that has a tensile strength of between about 2500 and about 6000 pounds/inch$^2$ ($17 \times 10^3$ to $41 \times 10^3$ kPa), typically preferably about 3000 pounds/inch$^2$ ($20 \times 10^3$ kPa). It is believed that during vulcanization the transfer sheeting is typically subjected to about 200 pounds/inch$^2$ ($14 \times 10^3$ kPa) of pressure. A support layer having a lower tensile strength than the indicated range may tend to give way during vulcanization such that the retroreflective elements sink thereinto. Transfers made with support layers having tensile strengths higher than the indicated range may tend to have reduced conformability and flexibility, and may therefore be subject to failure, e.g., cracking or tearing away from the substrate, when the resultant article to which they are applied is flexed in use.

The support layer should have a break strength of at least about 4 pounds/inch-width (7 Newtons/centimeter-width). Support layers having a break strength lower than the indicated level will typically tend to be too flimsy and may be subject to dislodgment of retroreflective elements during handling or when the resultant article is in use.

As discussed above and illustrated in FIG. 2, in some embodiments of the invention, support layer 22 may be dual-layer, comprising binder layer 24 in which retroreflective elements 15 are partially embedded and bonding layer 26. In such dual-layer support layers, in addition to providing a strong, preferably essentially inseparable bond therebetween, binder layer 24 and bonding layer 26 can be separately formulated to optimize different properties. For instance, binder layer 24 can be formulated to optimize its color and adhesion to retroreflective elements 15, and bonding layer 26 can be formulated to optimize its adhesion to the substrate (not shown) to which the transfer is to be applied.

The support layer, or binder layer thereof, may comprise a whitening agent such as a pigment, e.g., titanium dioxide, or dye to increase the overall whiteness of the transfer. Alternatively, it may comprise one or more other coloring agents selected to impart a different color thereto, e.g., pigments or dyes which impart green, blue, or red color.

Some illustrative examples of binder materials which can be used in the support layers of retroreflective transfers of the invention include thermoplastic, heat-activated, ultraviolet-cured, and E-beam-cured adhesives.

Additionally, the support layer will typically also comprise one or more weathering agents, stabilizers, ultraviolet absorbers, antioxidants, energy quenchers, plasticizers, adhesion promoters, etc. in view of the properties desired for the ultimate application for which the sheeting is being prepared.

Selection of the bonding layer, or overall support layer if the support layer is monolayer, will be dependent at least in part upon the characteristics of the desired substrate for which the transfer is being prepared and the conditions to which it is anticipated the resultant article will be subjected. In the case of transfers to be bonded to tire sidewalls, the bonding layer typically comprises a vulcanizable or curable elastomer which, is compatible with the tire elastomer.

Some illustrative examples of commercially available materials which are believed to be suitable for use in the bonding layer of transfers of the invention include A1638 Natural Rubber Adhesive, from B.F. Goodrich Co., UNIROYAL 6287 Natural Rubber Adhesive, from Uniroyal Tire Company, and CHEMLOCK 252, from Hughes Lord Corporation. Typically, selection of the bonding layer will be determined in part by the nature of the article to which the transfer is to be applied. For instance, if the article substantially comprises natural rubber, the bonding layer will typically be formulated as such. If the article substantially comprises synthetic rubber, the bonding layer will accordingly be formulated as such, e.g., HYPALON Brand elastomers from B. F. Goodrich, NEOPRENE Brand elastomers from E. I. du Pont de Nemours.

Figure 2:
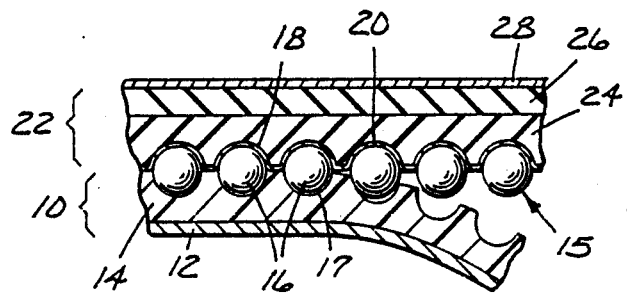
FIG. 2 is a cross-sectional illustration of a portion of an intermediate construction, subsequent to that shown in FIG. 1, of a retroreflective transfer of the invention during its fabrication.

As shown in FIG. 2, in some instances, bonding layer 26 will be covered by release liner 28, particularly where bonding layer 26 is somewhat tacky or otherwise tends to capture dirt, or is likely to be exposed to dirt. For instance, bonding layer 26 may be substantially made up of uncured elastomer such as natural rubber.

Figure 3:
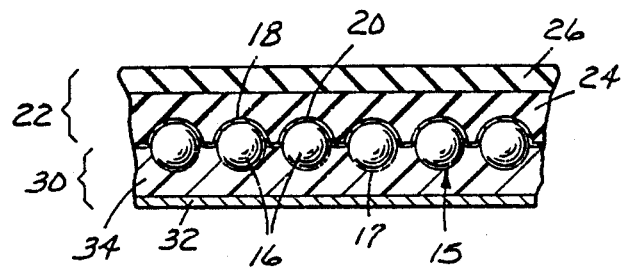
FIG. 3 is a cross-sectional illustration of a portion of a completed retroreflective transfer of the invention following application of a dimensionally stable premask thereto.

Following formation of the support layer, or at least the binder layer thereof when the support layer is dual-layer, the carrier is removed, thereby exposing the front surfaces of the retroreflective elements. In accordance with the present invention, a dimensionally stable premask is then applied to the front surface of the retroreflective elements. FIG. 3 illustrates the retroreflective transfer shown in FIG. 2 after application of premask 30 comprising backing 32 and adhesive layer 34 to front surfaces 17 of retroreflective elements 15.

A typical use for transfers of the invention is for application to the sidewalls of a vehicle tire, such as a cycle or automobile. A typical configuration following conversion for transfers of the invention which are to be used for that purpose is in a substantially rectangular strip, e.g., about 3/16 inch (0.5 centimeter) wide and several inches long. In such instances, the premask of transfers of the invention should have a tensile strength of at least about 15 pounds/inch-width (25 Newtons/-Centimeter-width), and an elongation of at about 10 percent in the lengthwise direction. Premasks having tensile strengths substantially lower than the indicated level may provide insufficient integrity or strength to permit convenient handling of the transfer and application of same to the desired substrate. If the properties of the premask material are directionally dependent, e.g., differ between "machine-direction" and "cross-" or "transverse-direction", then typically the premask will be oriented such that following conversion the highest tensile strength and elongation properties will be parallel to the lengthwise direction of the strip.

Typically, it is desired that the premask be flexible to facilitate storage and handling of the transfers. For instance, a premask will typically be sufficiently flexible to be wrapped around itself on a ⅛ inch (0.3 centimeter) radius.

The thickness of the premask is typically between about 2 and about 5 mils (50 and 125 microns). Premasks with thicknesses outside this range may be used, however, typically those which are thinner than the indicated range may tend to provide insufficient strength whereas those which are thicker than the indicated range may tend to be too stiff to permit the transfer to be conformed to a substrate or to be handled easily.

The premask typically should provide an adhesion to the retroreflective elements of between about 50 and about 450 grams/inch-width (20 and 180 grams/centimeter-width), preferably at the lower end of this range to facilitate ultimate removal. Premasks which provide levels of adhesion outside the indicated range may be used in some embodiments, however, those which provide lower adhesion than the indicated range may tend to prematurely separate from the other portion of the transfer. Premasks which provide substantially greater levels of adhesion may tend to be too difficult to remove from the transfer when desired.

If it is intended that the premask is to remain on the transfer throughout part of the process of fabrication of the ultimate article, e.g., curing of a tire, the premask should then be selected to retain its desired removal and strength properties under the expected conditions, e.g., temperature, pressure, moisture, etc., of that process.

Some illustrative examples of materials which may be used as premasks in sheetings of the invention include SCPS-2 Prespacing Tape, 658 Cover-Up Tape, 8401, 8402, and 8403 Polyester Film Silicone Adhesive Tape, 5480 and 5490 Teflon Silicone Adhesive Tapes, and 5413 KAPTON Silicone Adhesive Tape, all available from 3M Company. Other illustrative examples include Thilmany Pulp and Paper Company's 50 Pound XKL-2 Basepaper coated with low tack acrylic, polyester, rubber, or silicone based adhesives or thermoplastics. Premasks comprising thermoplastic adhesive layers on paper or polyester backing which are heat laminated to the front surface of the retroreflective elements can typically be easily removed later. Some examples of thermoplastic materials, i.e., those which soften at about 200° F. (95° C.), include low density polyethylene, ethylene-vinyl acetate copolymers, ethylene methacrylic acid copolymer, e.g., the NUCREL Brand series available from Du Pont, plasticized polyvinyl chloride, etc.

In some instances, it may be desired to treat either the front surfaces of the retroreflective elements or the exposed surface of the adhesive layer of the premask to control the adhesion therebetween as desired. Such treatments might include prime coatings of some form, adhesion promoters, release agents, etc. For instance, a treatment that will provide high adhesion until heated, but which reduces its adhesion greatly after heating could be of great utility when the premask is to be left on during vulcanization and removed afterward.

Application of retroreflective transfers of the invention to tires may be achieved by placing a transfer of appropriate dimension on the proper location of the unvulcanized or green tire casing, and then putting this assembly in the tire mold. Alternatively, a transfer of appropriate dimension may be placed in the mold in the proper location prior to inserting the green tire casing. When sufficient heat and pressure are applied in the tire mold to cure the vulcanizable portion of the sheeting and the tire casing, the transfer will be embedded in the tire casing, with the vulcanizable portion of the support layer vulcanizing with the elastomer of the tire sidewall such that the transfer forms a substantially integral part of the tire sidewall.

Figure 4:
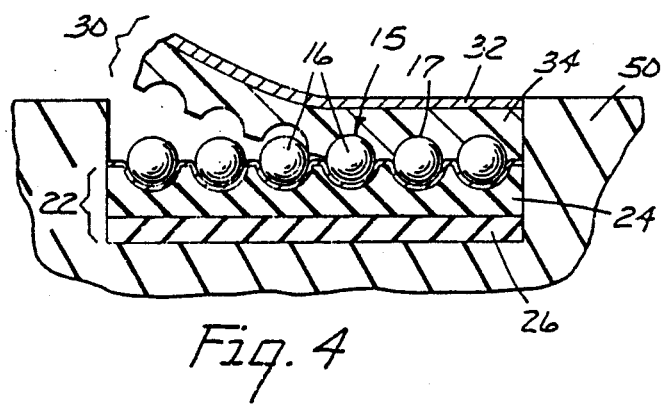
FIG. 4 is a cross-sectional illustration of a portion of a retroreflective sheeting of the invention which has been bonded to a substrate and from which the reinforcing premask is being removed.

FIG. 4 shows portion 50 of the side wall of a tire which was formed with a transfer of the invention applied thereto. As shown in the Figure wherein premask 30 is partially removed, the transfer is partially recessed into the level of the surface of side wall 50 because premask 30 was left in place during vulcanization to protect front surfaces 17 of retroreflective elements 15.

Figure 5:
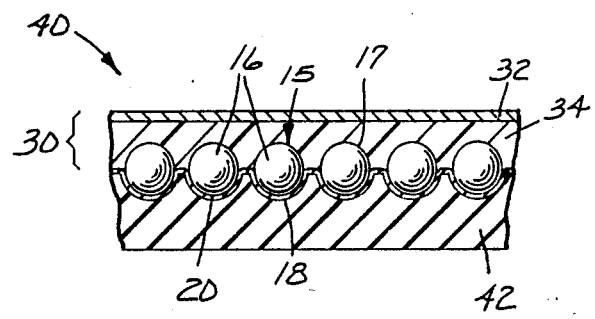
FIG. 5 is a cross-sectional illustration of a portion of another embodiment of a completed retroreflective transfer of the invention.

FIG. 5 illustrates another embodiment of transfers of the invention wherein transfer 40 comprises monolayer of retroreflective elements 15 comprising microspheres 16 with specular reflectors 18 on rear surfaces 20 thereof, which are partially embedded in single layer support layer 42. Front surfaces 17 of retroreflective elements 15 are adhered to premask 30 which comprises backing 32 and adhesive layer 34.

Figure 6:
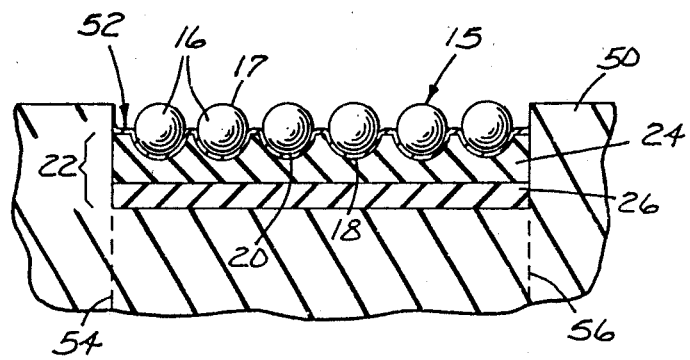
FIG. 6 is a cross-sectional illustration of a portion of a retroreflective transfer of the invention which was bonded to a substrate and from which the reinforcing premask was removed prior to vulcanization.

FIG. 6 shows portion 50 of a tire side wall to which transfer 52, which comprises retroreflective elements 15 and dual support layer 22, has been applied. The premask (not shown) was removed prior to vulcanization, therefore front surfaces 17 of retroreflective elements 15 are substantially flush or level with the surface of tire sidewall 50. Support layer 22 comprises binder layer 24 and bonding layer 26. A typical location of stress and failure in tire side walls to which retroreflective sheetings have been applied is along dotted lines 54 and 56. When tire 50 is flexed, the stress tends to cause a split to begin at the outer surface of the tire along the edge of the retroreflective sheeting and to propagate inward, ultimately penetrating completely through the tire. It has been found that retroreflective transfer of the present invention will reduce the likelihood of such failure. This is believed to be due at least in part to the reduced thickness of the transfer sheeting which lessens the likelihood of developing, and slows the propagation of, cracks 54 and 56.

EXAMPLES

The invention will be further explained by the following illustrative examples which are intended to be nonlimiting. Unless otherwise indicated, all amounts are expressed in parts by weight.

Except as otherwise indicated, the following test procedures were used to evaluate the microsphere-based retroreflective articles discussed in the Examples.

Retroreflective Brightness

Retroreflective brightness was measured using a retroluminometer as described in U.S. defensive publication No. T987,003 at divergence angles of about 0.2° and 1.5° and at entrance angles of about −4°, 40°, and 50°.

Premask Adhesion

Premask adhesion was determined providing a 1 inch by 6 inch piece of the sheeting being tested with the premask still adhered thereto. The premask is separated from the remainder of the sheeting at one end of the sample, and the free end of the premask then placed in one jaw and the remainder of the sheeting in the other jaw of the a Kiel Tester from Dow Corning. The jaws are then separated at a rate of about 12 inches/minute and the average strain value observed.

Breaking Force

Breaking Force was determined by placing a 3/16 inch (0.5 centimeter) wide strip of the retroreflective sheeting being tested in an Instron 1122 at an initial jaw separation of 2 inches (5 centimeters) and then stretching at a cross head speed of 10 inches/minute (25 centimeters/minute) while measuring the force.

Elongation

Elongation was determined as the percentage elongation at the point of break when determining Breaking Force.

Thickness

Thickness was measured with a hand-held spring caliper.

Flex Resistance

Flex Resistance was determined as percentage of Retroreflective Brightness retained by 3/16 inch (0.5 centimeter) wide samples of retroreflective sheeting bonded to rectangular rubber substrates whereupon the rubber substrates were flexed 204,400 times through a cycle of elongation and compression. The rubber substrates were secured between two jaws of a Getty Flex Tester at a separation of 5 inches (13 centimeters). Each cycle comprised elongation to 6.5 inches (17 centimeters) and compression to 3.5 inches (8.9 centimeters) separation. Samples were evaluated vertically (single retroreflective strip parallel to rectangular rubber strip and axis of elongation/compression) and horizontally (retroreflective strip perpendicular to rectangular rubber sample and axis of elongation/compression).

EXAMPLE

A polyethylene-coated paper, RM-35526 from Schoeller Technical Papers Inc., was prepared by applying a low adhesion sizing treatment to the coated side. Glass microspheres having refractive indexes of about 1.9 and average diameters of about 50 to about 75 microns were cascaded onto the treated side of the polyethylene-coated paper to form a closely packed monolayer thereon, and the arrangement then heated so as to sink the microspheres partially, i.e., to about 40 percent of their diameter, into the coating. Following cooling of the arrangement, an aluminum vapor coat of at least 900 angstroms thickness was applied to the exposed portions of the microspheres. A binder resin comprising:

| Amount | Component |
|---|---|
| 25.66 | Polytetramethylene ether diamine having a molecular weight of 12,000–16,000, backbone polymer. |
| 12.37 | Titanium dioxide, white colorant. |
| 0.65 | DMP30 - 2,4,6-tri(dimethylaminomethyl)phenol available from Rohm and Haas, hardening agent. |
| 35.66 | Toluol, solvent. |
| 11.15 | Xylol, solvent. |
| 12.74 | EPON 828 - diglycidyl ether of Bisphenol A, available from Shell Oil Co., epoxy resin. |
| 0.91 | Bisphenol adduct of methylene bis(4-phenylisocyanate), a phenol-blocked isocyanate accelerator. |
| 0.87 | Z-6020 - N-beta-amino-gamma-amino-propyltrimethoxysilane, available from Dow Chemical Co., adhesion promoter. | was prepared, and then coated over the aluminum-coated microspheres at about 5 mils (125 microns) wet thickness. This construction was partially cured at about 200° F. (95° C.) for about 3 minutes.

A bonding layer was then formed on the back side of a binder layer by coating, at a rate of about 3 grains per 4 inch by 6 inch area, the following composition:

| Amount | Component |
|---|---|
| 47.5 | SMRCV60 - standard Malaysian natural rubber, from Goodyear Rubber Co. |
| 15.8 | NEOPRENE W - polychloroprene rubber from du Pont, synthetic rubber. |
| 0.32 | PEPTON 44 - activated dithio-bisbenzanilide on an inert carrier, from American Cyanamid Co., peptizer. |
| 0.63 | Stearic Acid, from Hum Ko Corp., lubricant. |
| 0.63 | ETHANOX 330 - 1,3,5-trimethyl-2,4,6-tris(3,5-di-tert-butyl-4-hydroxybenzyl) benzene, from Ethyl Corp., antioxidant. |
| 0.63 | MAGLITE D - magnesium oxide, from Calgon Corp., activator for neoprene. |
| 12.7 | N-550 FEF BLACK - carbon black, from Cabot Corp., reinforcing agent. |
| 12.7 | HISIL 233 - precipitated hydrated amorphous silica, from Pittsburgh Plate Glass Ind., reinforcing agent. |
| 3.2 | CIRCOLITE RPO - chemically neutralized heavy napthenic distillate, from Sun Refining and Marketing Co., plasticizer. |
| 3.2 | Zinc Oxide, from New Jersey Zinc Co., activator for natural rubber. |
| 1.6 | CRYSTEX 950T20 - compounded polymeric sulfur, sulfur, and naphthenic oils, from Stauffer Chemical Co., vulcanizer. |
| 0.48 | SANTOCURE - n-cyclohexyl-2-benzothiazole-sulfonamide, from Monsanto Co. |
| 0.66 | AGERITE D - polymerized 2,2,4-trimethyl-1,2-dihydroquinoline, from R.T. Vanderbilt Co., antioxidant. |

| Amount | Component |
|---|---|
| 26.5 | SMRCV60 |
| 9.1 | SBR 1778 - oil extended styrene butadiene, from Copolymer Rubber and Chemical Co., synthetic rubber. |
| 11.0 | EPSYN 55 - ethylene propylene terpolymer, from Copolymer Rubber and Chemical Co., synthetic rubber. |
| 0.88 | ETHANOX 330. |
| 22.1 | N-550 FEF BLACK. |
| 6.4 | CIRCOLITE RPO. |
| 22.1 | Zinc Oxide. |
| 0.44 | Stearic Acid. |
| 11.1 | CRYSTEX 950T20 |
| 0.44 | SANTOCURE |

The construction was then dried at about 200° F. (95° C.) for about 6 minutes, and then partially cured at about 150° F (65° C.) for about 2 hours.

The carrier was then stripped from the front surfaces of the microspheres and the premask laminated in place thereof. The premask was a SCPS-2 Prespacing Tape which comprises a backing of a paper (43 pound/3000 feet$^2$: basis) saturated with polyethyl acrylate and a natural rubber latex adhesive comprising PICCOLYTE S115 Tackifier, available from Hercules Inc., and titanium dioxide filler.

The resultant sheets were then cut into strips, i.e., transfers, about 3/16 inch (0.5 centimeter) in width.

The rubber composition was as follows:

This composition vulcanizes when heated to about 355° F. (180° C.) for about 5 minutes.

The strips of retroreflective sheeting were laid upon samples of the rubber compound, back side down, and pressed with a hand roller. The samples were then placed into a metal mold for hot press vulcanization under about 200 pounds/inch$^2$ ($1.4 \times 10^3$ kPa) for about five minutes at about 355° F. (180° C.), and then cooled to room temperature in a water bath.

The properties of the resultant sheeting were as follows.

| | Retroreflective Brightness* | |
|---|---|---|
| | Observation Angle | |
| Entrance Angle | 0.2° | 1.5° |
| −4° | 390 | 22.0 |
| 20° | 380 | 18.0 |
| 40° | 80 | 7.0 |

*Minimum brightness in candelas/lux/meter$^2$

Thickness of the sheetings was about 7 to about 9 mils (175 to 225 microns) prior to removal of the premask and about 3 to about 4 mils (75 to 100 microns) thick after removal of the premask. The effective thickness of the binder layer was about 1 to about 2 mils (25 to 50 microns). The binder layer was between about 2.5 and about 5 microns thick.

Flex resistance brightness retention was 80 percent or better.

Break strength was at least 15 pounds/inch-width (25 Newtons/centimeter-width) with premask.

Elongation was less than 10 percent with premask and 200 percent or more without the premask.

Premask adhesion was about 400 grams/inch-width.

Various modifications and alterations of this invention will become apparent to those skilled in the art without departing from the scope and spirit of this invention.

What is claimed is:

1. A retroreflective transfer comprising (a) support layer, at least the back stratum of which is a vulcanizable or curable elastomer, said support layer having an effective thickness of less than about 3 mils; (b) a monolayer of retroreflective elements partially embedded in and protruding from said support layer, at least some of said retroreflective elements being oriented such that the front surfaces of said retroreflective elements protrude from said support layer so as to permit light incident thereto to be retroreflected by said retroreflective elements; and (c) a dimensionally stable premask releasably adhered to the front surfaces of said retroreflective elements.

2. The transfer of claim 1 wherein said premask comprises an adhesive layer and a backing layer, said adhesive layer being in contact with said retroreflective elements.

3. The transfer of claim 1 wherein said premask provides adhesion to said retroreflective elements of between 50 and about 450 grams/inch-width.

4. The transfer of claim 1 wherein said premask has a tensile strength of at least about 15 pounds/inch$^2$.

5. The transfer of claim 1 wherein said premask will elongate less than about 12 percent when subjected to a tensile force of about 15 pounds/inch-width.

6. The transfer of claim 1 wherein said premask has an elongation of between about 4 and about 10 percent when subjected to a tensile force of about 15 pounds/inch-width.

7. The transfer of claim 1 wherein said premask is sufficiently flexible to be wrapped around itself on a ⅛ inch radius.

8. The transfer of claim 1 wherein said effective thickness of said support layer is less than about 2 mils.

9. The transfer of claim 1 wherein said support layer comprises a binder layer in which said retroreflective elements are partially embedded and a bonding layer on the back side of said binder layer.

10. The transfer of claim 1 wherein said support layer contains at least one of the following: coloring agent, weathering agent, stabilizer, ultraviolet absorber, antioxidant, energy quencher, plasticizer, and adhesion promoter.

11. The transfer of claim 1 wherein said retroreflective elements are microspheres between about 40 and about 200 microns in diameter and the effective thickness of said support layer is between about 25 and about 50 microns.

12. The transfer of claim 1 wherein said support layer is thermally stable up to about 400° F. for at least five minutes.

13. The transfer of claim 1 wherein the elongation of said support layer is at least about 100 percent.

14. The transfer of claim 1 wherein the elongation of said support layer is at least about 200 percent.

15. The transfer of claim 1 wherein said support layer has a tensile strength between about 2500 and about 6000 pounds/inch$^2$.

16. The transfer of claim 1 wherein said support layer has a break strength of at least about 4 pounds/inch-width.

17. The transfer of claim 1 wherein said retroreflective elements comprise substantially transparent microspheres, the front surfaces of which protrude from said support layer, said microspheres having reflectors on the rear surfaces thereof.

18. The transfer of claim 17 wherein said microspheres are made from glass or synthetic resin.

19. The transfer of claim 17 wherein said reflectors comprise are least one of the following: metal coatings, metal flakes, or dielectric coating.

20. The transfer of claim 17 wherein said reflectors comprise aluminum.

21. The transfer of claim 17 wherein said microspheres have an average diameter of between about 40 and about 200 microns.

22. The transfer of claim 1 consisting essentially of said support layer, said monolayer of retroreflective elements, and said premask.

* * * * *

UNITED STATES PATENT AND TRADEMARK OFFICE
CERTIFICATE OF CORRECTION

PATENT NO. : 4,955,690

DATED : September 11, 1990

INVENTOR(S) : Chester A. Bacon, Jr.

It is certified that error appears in the above-identified patent and that said Letters Patent is hereby corrected as shown below:

ON TITLE PAGE:
In the References Cited section on the first page, U.S. Patent No. 4,648,695 should read --4,648,932--.

In Column 1, line 36, "somewhate" should read --somewhat--.

In Column 3, Line 36, "DRAWING" should read --DRAWINGS--.

In Column 7, Line 48, delete the comma after the word "which".

In Column 11, Line 68, add the word --antioxidant.--.

In Column 12, delete lines 1-4.

In Column 12, the table on lines 8-20 should be moved to follow line 34.

In Column 13, Line 7, after "(a)" insert --a--.

Signed and Sealed this

Thirty-first Day of December, 1991

Attest:

HARRY F. MANBECK, JR.

*Attesting Officer*     *Commissioner of Patents and Trademarks*